(12) United States Patent
Yu et al.

(10) Patent No.: US 10,578,331 B2
(45) Date of Patent: Mar. 3, 2020

(54) CONTROL STRUCTURE OF AN AIR CONDITIONING SYSTEM AND CONTROL METHOD OF THE SAME

(71) Applicants: York Guangzhou Air Conditioning and Refrigeration Co. Ltd., Qingyuan (CN); Johnson Controls Technology Company, Auburn Hills, MI (US)

(72) Inventors: Demao Yu, Wuxi (CN); Shuang Wu, Wuxi (CN)

(73) Assignees: Johnson Controls Technology Company, Auburn Hills, MI (US); York Guangzhou Air Conditioning and Refrigeration Co., Ltd., Qingyuan, Guangdong (CN)

( * ) Notice: Subject to any disclaimer, the term of this patent is extended or adjusted under 35 U.S.C. 154(b) by 41 days.

(21) Appl. No.: 15/921,347

(22) Filed: Mar. 14, 2018

(65) Prior Publication Data

US 2018/0266721 A1 Sep. 20, 2018

(30) Foreign Application Priority Data

Mar. 15, 2017 (CN) .......................... 2017 1 0151811

(51) Int. Cl.
*F24F 11/65* (2018.01)
*G05B 15/02* (2006.01)
(Continued)

(52) U.S. Cl.
CPC .............. *F24F 11/65* (2018.01); *F24F 11/46* (2018.01); *F24F 11/54* (2018.01); *F24F 11/80* (2018.01);
(Continued)

(58) Field of Classification Search
None
See application file for complete search history.

(56) References Cited

U.S. PATENT DOCUMENTS 6,148,019 A * 11/2000 Fishman ............... H02M 7/493
219/661
8,005,640 B2 * 8/2011 Chiefetz ................ F24T 10/00
702/130
(Continued)

FOREIGN PATENT DOCUMENTS

CN 102353122 B 6/2013
EP 0668474 A2 8/1995
(Continued)

OTHER PUBLICATIONS

Extended European Search Report for EP Application No. 18160581 dated Jul. 17, 2018, 10 pgs.

*Primary Examiner* — Ramesh B Patel
(74) *Attorney, Agent, or Firm* — Fletcher Yoder, P.C.

(57) ABSTRACT

The present disclosure is directed to a method for controlling a system that includes a modular set having a plurality of variable frequency modular units. The method includes setting a load ratio range for the plurality of variable frequency modular units, inputting an energy adjustment amount, and setting different operations for the modular set based on the energy adjustment amount. During a first operation, a first frequency adjustment amount of a corresponding variable frequency modular unit is determined based on the energy adjustment amount and an operating position of the corresponding variable frequency modular unit. During a second operation, a second frequency adjustment amount of a corresponding variable frequency modular unit is determined based on the energy adjustment amount and the operating position of the variable frequency modular unit. The first operation or the second operation causes the variable frequency modular units to operate within the load ratio range.

20 Claims, 12 Drawing Sheets

(51) Int. Cl.
*F24F 11/80* (2018.01)
*F24F 11/54* (2018.01)
*F24F 11/46* (2018.01)
*F24F 11/86* (2018.01)
F24F 140/50 (2018.01)
F24F 110/10 (2018.01)
F24F 140/20 (2018.01)

(52) U.S. Cl.
CPC .............. *F24F 11/86* (2018.01); *G05B 15/02* (2013.01); *F24F 2110/10* (2018.01); *F24F 2140/20* (2018.01); *F24F 2140/50* (2018.01)

(56) References Cited

U.S. PATENT DOCUMENTS

| | | | |
|---|---|---|---|
| 2004/0163396 A1* | 8/2004 | Starling | F25B 49/02 62/127 |
| 2009/0277197 A1* | 11/2009 | Gambiana | F25B 39/028 62/115 |
| 2010/0082161 A1* | 4/2010 | Patch | F24F 11/0001 700/276 |
| 2011/0046790 A1* | 2/2011 | Miller | F24F 11/77 700/276 |
| 2011/0125451 A1* | 5/2011 | Cheifetz | F24T 10/00 702/130 |
| 2011/0283718 A1 | 11/2011 | Ueda | |
| 2012/0174609 A1 | 7/2012 | Matsuo et al. | |
| 2013/0098086 A1* | 4/2013 | Sillato | F25B 49/02 62/184 |
| 2014/0048244 A1* | 2/2014 | Wallace | F28F 27/00 165/253 |
| 2018/0094827 A1* | 4/2018 | Knight | F24F 11/30 |
| 2018/0259918 A1* | 9/2018 | Asmus | G05B 15/02 |

FOREIGN PATENT DOCUMENTS

| | | |
|---|---|---|
| JP | 2005114295 A | 4/2005 |
| JP | 2007225264 A | 9/2007 |
| JP | 2016048145 A | 4/2016 |
| KR | 20130053936 A | 5/2013 |
| WO | 2016158852 A1 | 10/2016 |

* cited by examiner

CONTROL STRUCTURE OF AN AIR CONDITIONING SYSTEM AND CONTROL METHOD OF THE SAME

CROSS REFERENCE TO RELATED APPLICATIONS

This application claims priority from and the benefit of Chinese Patent Application No. 201710151811.5, filed Mar. 15, 2017, entitled "CONTROL STRUCTURE OF AN AIR-CONDITIONING SYSTEM AND CONTROL METHOD OF THE SAME," the disclosure of which is hereby incorporated by reference in its entirety for all purposes.

BACKGROUND

The present disclosure relates to an air conditioning system having modular air-cooled/water-cooled chillers (heat pumps), and more particularly to a structure and a method for adjusting and controlling energy of a variable frequency modular air cooled/water cooled chiller (heat pump) set of an air conditioning system.

Conventional air conditioning systems have a modular air-cooled/water-cooled chiller (heat pump) set (hereinafter referred to as "modular set" in brief). The modular set is a large capacity air conditioning unit formed by a plurality of small capacity air-cooled/water-cooled chiller (heat pump) sets, which may provide advantages such as flexibility, convenience, energy conservation, and reliability. Conventional modular sets employ an invariable frequency compressor, which may cause frequent start/stop of the modular set and/or large fluctuations in fluid temperature. With increasingly higher demands on energy conservation and wider applications of variable frequency technologies, modular sets include variable frequency compressors. However, variable frequency compressors utilize energy adjustment and control method during operation.

Unfortunately, existing schemes for adjusting and controlling energy usage of a modular set use a difference between a fluid temperature and a target temperature as well as a fluid temperature change trend. As such, the compressor frequently undergoes a start/stop process that causes an increase in electrical energy usage and relatively large fluid temperature fluctuations, thereby reducing the advantages provided by the modular set.

SUMMARY

Embodiments of the present disclosure are directed toward a method of controlling an air conditioning system, the air conditioning system having a modular set that includes a plurality of variable frequency modular units. The method includes setting a target load ratio range for each of the plurality of variable frequency modular units, where an operating energy efficiency of each of the plurality of variable frequency modular units is greater than or equal to a predetermined energy efficiency value within the target load ratio range, inputting an energy adjustment amount, and setting different operations for the modular set based on the energy adjustment amount, including a load operation or an unload operation. In the load operation, frequency adjustment amounts of the plurality of variable frequency modular units are determined based on the energy adjustment amount and an operating position of each variable frequency modular unit operating within the target load range of the plurality of variable frequency modular units. In the unload operation, frequency adjustment amounts of the plurality of variable frequency modular units are determined based on the energy adjustment amount and an operating position of each variable frequency modular unit operating within the target load ratio range of the plurality of variable frequency modular units. The load operation or the unload operation causes the plurality of variable frequency modular units to operate within the target load ratio range after load or unload is performed.

According to another aspect of the present disclosure, an air conditioning system is provided, where the air conditioning system includes a modular set that includes a plurality of variable frequency modular units. The air conditioning system further includes a main controller, where a variable frequency modular unit of the plurality of variable frequency modular units is set as a main variable frequency modular unit and the remaining variable frequency modular units of the plurality of variable frequency modular units are set as slave variable frequency modular units. The main controller is coupled to the main variable frequency modular unit and to each of the slave variable frequency modular units. As such, the main controller performs a load operation, an unload operation, or a hold operation to the plurality of variable frequency modular units based on an input energy adjustment amount.

Other features, advantages and embodiments of the present disclosure may be illustrated by considering the preferred embodiments, drawings and claims below. In addition, it should be understood that the embodiments described below are illustrative, and intended to provide further explanation, rather than limiting the scope of the present disclosure. Further, the specific implementations and specific examples only represent the embodiments of the present disclosure. To those skilled in the art, various changes and modifications within the spirit and scope of the present disclosure will become obvious from the preferred embodiments.

BRIEF DESCRIPTION OF THE DRAWINGS

These and other features and advantages of the present disclosure may be better understood from the accompanying drawings below. Throughout the drawings, the same reference numerals represent the same components, in which.

DETAILED DESCRIPTION

Figure 1:
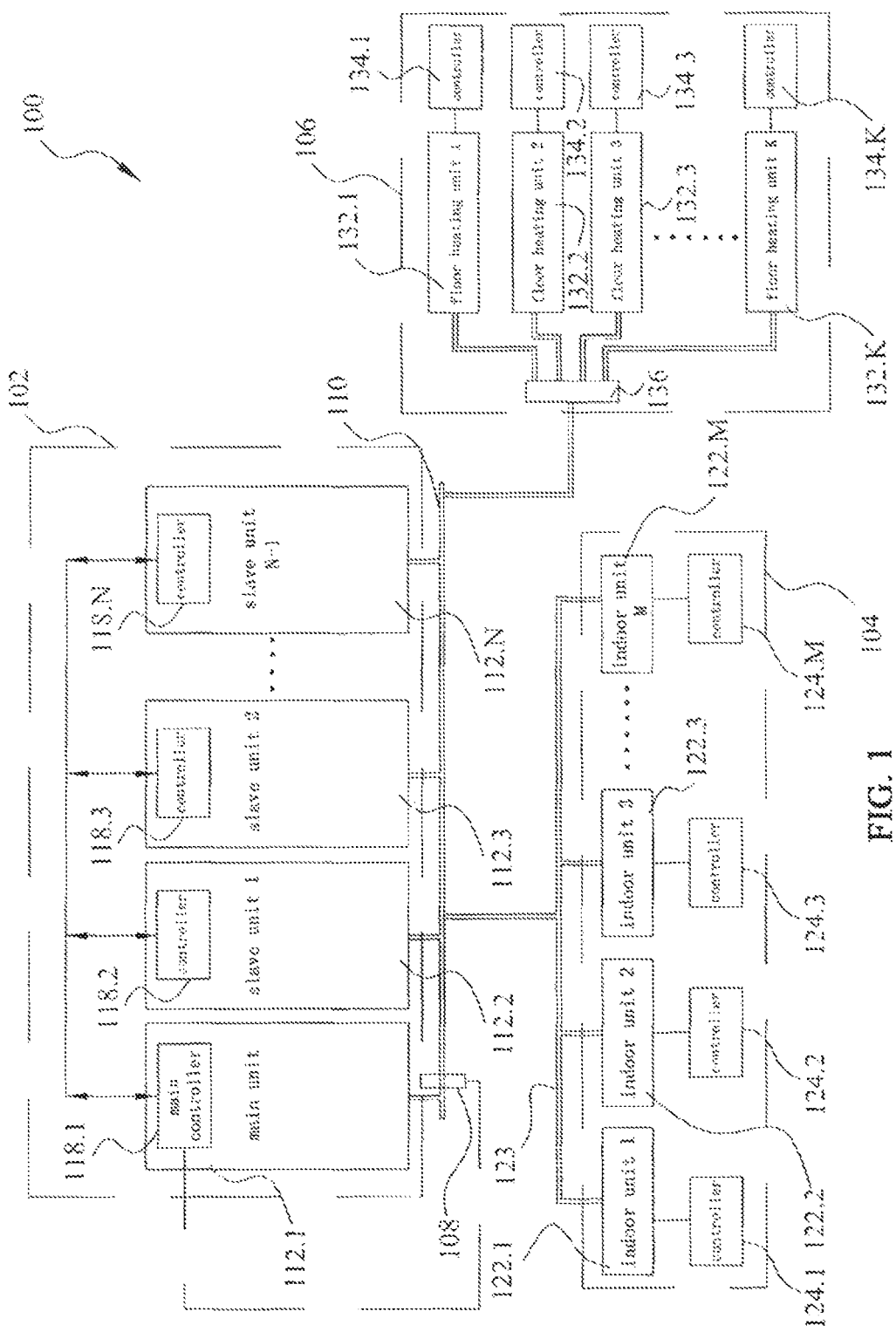
FIG. 1 is a schematic structural diagram of an embodiment of an air conditioning system, in accordance with an aspect of the present disclosure.

Hereinafter, various embodiments of the present disclosure will be described with reference to the accompanying drawings as a constituent part of the description. It should be noted that although terms indicating directions (such as "front," "back," "up," "down," "left," and "right") are used herein to describe various structural parts and elements of the present disclosure, these terms are only for facilitating the depiction and are determined based on the orientations shown in the drawings. Because the examples disclosed in the present disclosure may be arranged based on different directions, these direction terms are only used for illustration and should not be regarded as limiting. In the drawings, same or similar reference numerals used herein indicate the same components, to avoid repetitive description.

The present technical solution ensures efficient operation of a modular unit through smart control in accordance with the characteristics of a variable frequency modular set. It is desirable to provide an improved structure and method for controlling an air conditioning system that has a variable frequency modular set so as to improve and enhance efficiency of the air conditioning system that includes the variable frequency modular set.

Turning to the drawings, FIG. 1 is a schematic structural diagram of an embodiment of an air conditioning system 100, in accordance with the present disclosure. As shown in FIG. 1, the air conditioning system 100 includes a variable frequency modular set 102, an indoor unit set 104, and a floor heating apparatus 106.

The variable frequency modular set 102 includes a plurality of variable frequency modular units (112.1, 112.2, . . . , 112.N). Each variable frequency modular unit includes a compressor, a condenser, an expansion valve, and an evaporator (not shown). During a refrigeration process, a high temperature, high pressure gaseous refrigerant discharged from the compressor exchanges heat with a cooling medium (e.g., a cooling fluid) in the condenser, thereby enabling the gaseous refrigerant to release heat and condense. The expansion valve throttles high pressure liquid refrigerant from the condenser so as to lower its pressure. Additionally, the low pressure refrigerant exchanges heat with a working fluid to be cooled inside the evaporator and absorbs heat from the working fluid to cool the working fluid. As such, the refrigerant evaporates into gaseous refrigerant. The gaseous refrigerant is subsequently drawn into the compressor and discharged as high pressure, gaseous refrigerant. This process is repeated to generate a continuous refrigeration effect.

During a heating process, the high temperature, high pressure gaseous refrigerant discharged from the compressor exchanges heat with a working fluid to be heated inside the condenser. As such, heat released from the gaseous refrigerant causes the refrigerant to condense, or transition from the gaseous state to a liquid state. The expansion valve throttles high pressure liquid refrigerant from the condenser to lower a pressure of the refrigerant. Low pressure, liquid refrigerant then exchanges heat with a heating fluid in the evaporator and absorbs heat to evaporate or transition from a liquid state to a gaseous state. Accordingly, gaseous refrigerant is drawn into the compressor and is discharged as a high pressure gaseous refrigerant. This process is repeated to continuously heat the working fluid in the condenser.

To output energy, a first portion of the evaporator is in fluid communication with refrigerant, and a second portion of the evaporator is in fluid communication with an intermediate fluid (e.g., the working fluid or the heating fluid) configured to flow within a conduit 110. During operation, increasing or decreasing a frequency of the compressor may correspondingly increase or decrease a rotary speed of the compressor, and thereby increase or decrease a flow rate of the refrigerant discharged by the compressor. Increasing or decreasing the flow rate of the refrigerant may increase or decrease an amount of energy transferred within the variable frequency modular unit. In the present disclosure, adjustment of the energy transferred within the variable frequency modular unit is controlled by adjusting the frequency of the compressor.

The indoor unit set 104 uses a cooling or heating function provided by the variable frequency modular set 102 to lower or raise an air temperature within a conditioned environment. In the present disclosure, the indoor unit set 104 includes a plurality of indoor units (122.1, 122.2, . . . , 122.M), where an energy receiving end of each indoor unit is fluidly coupled with the conduit 110 to receive the intermediate fluid from the variable frequency modular set 102. Additionally, each indoor unit may be communicatively coupled with a corresponding controller (124.1, 124.2, . . . , 124.M). Each controller adjusts a flow rate of intermediate fluid and/or air through a corresponding indoor unit, thereby controlling the temperature within the conditioned environment.

The floor heating apparatus 106 raises an air temperature within a certain area of the conditioned environment by using the heating function provided by the variable frequency modular set 102. In accordance with embodiments of the present disclosure, the floor heating apparatus 106 includes a plurality of floor heating units (132.1, 132.2, . . . , 132.K), where each floor heating unit is fluidly coupled to the variable frequency modular set via the conduit 110 and a distribution manifold 136. For example, the distribution manifold 136 receives the intermediate fluid from the variable frequency modular set 102 and distributes the intermediate fluid to the plurality of floor heating units. Each floor heating unit of the plurality of floor heating units is communicatively coupled to a corresponding controller (134.1, 134.2, . . . , 134.K). Each controller adjusts a flow rate of the intermediate fluid to the corresponding floor heating unit, thereby controlling the temperature within the certain area of the conditioned environment.

In the air conditioning system 100 shown in FIG. 1, one variable frequency modular unit of the plurality of variable frequency modular units (112.1, 112.2, . . . , 112.N) is set as a main unit, while the remaining variable frequency modular units are set as slave units (1, 2., . . . , N−1). As an example, the variable frequency modular unit 112.1 may be selected as a main unit, while the other variable frequency modular units (112.2, . . . , 112.N) are set as slave units (1, . . ., N−1). A main controller 118.1 is provided in the main variable frequency modular unit 112.1, and controllers (118.2, . . . , 118.N) are provided in respective slave units (1, . . ., N−1). The main controller 118.1 is communicatively coupled with the controllers (118.2, . . . , 118.N) in each of the slave units (1, . . ., N−1), such that the main controller 118.1 receives an operating state of the compressor (e.g., a current operating frequency of the compressor) from the controllers (118.2, . . . , 118.N) in the slave units (1, . . ., N−1), and transmits a control signal for adjusting the operating state of the respective compressors (e.g., adjusting the current operating frequency of the compressor) to the controllers (118.2, . . . , 118.N) in all of the slave units (1, . . . , N−1).

A temperature sensor 108 is provided within the conduit 110 for monitoring a temperature of intermediate fluid entering and/or exiting the main unit 112.1. The temperature of the intermediate fluid entering and/or exiting the main unit 112.1 may be used as a current temperature, $T_w$, of the intermediate fluid entering and/or exiting the variable frequency modular unit set 102 of the air conditioning system 100.

Figure 2:
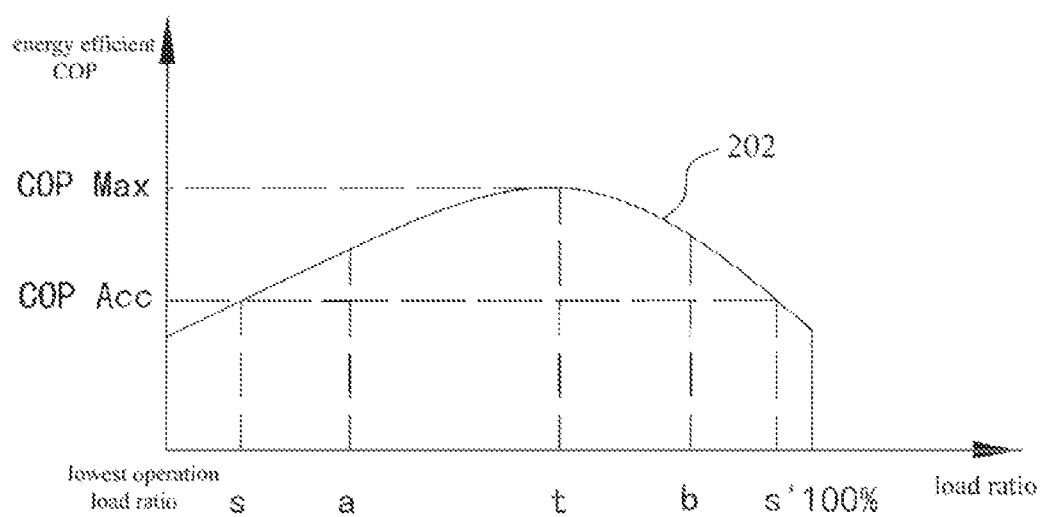
FIG. 2 is an embodiment of an energy efficiency output diagram of each variable frequency modular unit of a variable frequency modular set under different load ratios, in accordance with an aspect of the present disclosure.

FIG. 2 is an energy efficiency diagram for each variable frequency modular unit (112.1, 112.2, . . . , 112.N) included in the variable frequency modular set 102 as a function of load ratio. The load ratio for each variable frequency modular unit, or the independent variable, is represented by the abscissa of FIG. 2 (ranging from the lowest operating load ratio to 100% load ratio). The energy efficiency for each variable frequency modular unit, or the dependent variable, is represented by the ordinate of FIG. 2. As shown in the illustrated embodiment of FIG. 2, as the load ratio for each variable frequency modular unit changes from the region with the lowest operating load ratio to the region with 100% load ratio, the energy efficiency profile forms an inverse parabola 202. At a load ratio, t, the energy efficiency of each variable frequency modular unit reaches a threshold value (i.e., COP Max). In some embodiments, an energy efficiency, COP Acc, which is shown on the ordinate of FIG. 2, represents an acceptable (e.g., target) energy efficiency for each variable frequency modular unit. Therefore, along a horizontal line extending from the energy efficiency, COP Acc, a pair of points intersect the inverse parabola 202, and a load range (s, s') is formed on the abscissa corresponding to the pair of intersecting points (i.e., all energy efficiencies within the load range (s, s') are equal to or greater than COP Acc). In some embodiments, during the load or unload process of the plurality of variable frequency modular units (112.1, 112.2, . . . , 112.N), adjustments to one or more variable frequency modular units of the plurality of variable frequency modular units are made, such that an operating energy efficiency of the one or more variable frequency modular units falls into the load range (s, s'). Further, an optimized interval (a, b) may be specified within the load interval (s, s'). The optimized interval (a, b) may enable the plurality of variable frequency modular units (112.1, 112.2, . . . , 112.N) to operate with an enhanced efficiency within the load interval (s, s'). In some embodiments, "a" denotes a shutdown point of the plurality of variable frequency modular units, and "b" denotes a start point of the plurality of variable frequency modular units. Setting the optimized range (a, b) may enable each variable frequency modular unit to operate with an energy efficiency that approaches point t.

The abscissa, the ordinate, and the function curve shown in FIG. 2 represent a model of performing load and unload processes for each variable frequency modular unit, in accordance with the present disclosure. According to the model shown in FIG. 2, the variable frequency modular set 102 has different energy efficiencies under different loads. In some embodiments, a peak is formed between the low load and the high load of the variable frequency modular set 102. An objective of the load/unload processes of the variable frequency modular set 102 is to enable the variable frequency modular set 102 to operate at the highest energy efficiency (e.g., as close as possible to the COP Max). The variable frequency modular unit load ratio "a" is used for shutdown of the module set 102, while the load ratio "b" is used for starting the module set 102. In some embodiments, an equation for determining the load ratio "a" is represented by Equation 1.

$$a = \frac{(n-1)}{n} * t \quad (1)$$

In Equation 1, n denotes a total number of variable frequency modular units whose operation is not limited in the variable frequency modular set 102, t denotes a load ratio when the module is at COP Max. Accordingly, the value of the load ratio a is greater than or equal to s, and less than t−x1, where s denotes a start load ratio and x1 represents an offset to prevent frequent start/stop of the module set 102. Additionally, the load ratio "b" may be represented by Equation 2.

$$b = t + \frac{t}{n} \quad (2)$$

Accordingly, the value of the load ratio b is less than or equal to s' and greater than t+x2, where s' denotes a corresponding load ratio having the same COP value as the start load ratio, s, when the load ratio is higher than t, and x2 represents an offset to further prevent frequent start/stop of the module set 102. In some embodiments, x1 and/or x2 may be between 0.05 and 3.

Figure 3:
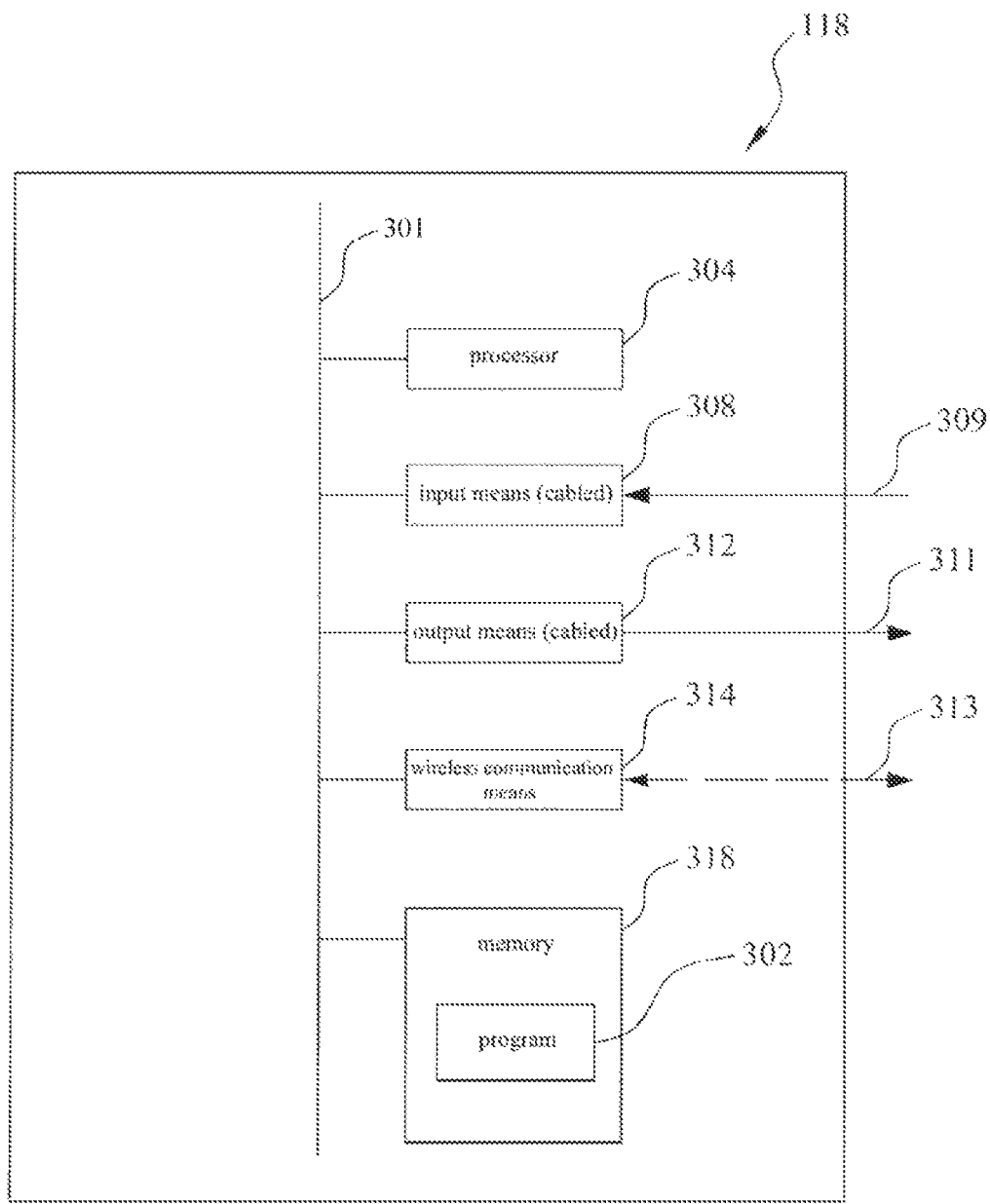
FIG. 3 is an embodiment of a schematic internal structural diagram of a main controller of the air conditioning system of FIG. 1, in accordance with an aspect of the present disclosure.

FIG. 3 is a schematic structural diagram of the main controller 118 of FIG. 1. As shown in the illustrated embodiment of FIG. 3, the main controller 118 includes a bus 301, a processor 304, an input (cabled) 308, an output (cabled) 312, a wireless communication device 314, and a memory 318 having a control program 302. The various components of the main controller 118, including the processor 304, the input (cabled) 308, the output (cabled) 312, the wireless communication device 314, and the memory 318, are communicatively coupled to the bus 302, thereby enabling the processor 304 to control operations of the input (cabled) 308, the output (cabled) 312, the wireless communication device 314, and the memory 318. Specifically, the memory 318 is arranged for storing programs, instructions, and/or data, while the processor 304 reads the programs, instructions, and/or data stored in the memory 318 and may store additional data to the memory 318. By executing the programs and instructions stored in the memory 318, the processor 304 controls operations of the input (cabled) 308, the output (cabled) 312, and the wireless communication device 314.

For instance, the input (cabled) 308 receives incoming signals and data from the variable frequency modular units (112.1, 112.2, ..., 112.N) via a connection line 309.

The output (cabled) 312 emits a control signal to the variable frequency modular units (112.1, 112.2, ..., 112.N) via a connection line 311.

The wireless communication device 314 may also emit a control signal to the variable frequency modular units (112.1, 112.2, ..., 112.N) via a wireless channel 313 and/or receive incoming signals and data from the variable frequency modular units ((112.1, 112.2, ..., 112.N) via the wireless channel 313.

It should be noted that embodiments of programs that implement the flow charts shown in FIGS. 4-12 are stored in the memory 318 of the main controller 118. By executing the programs stored in the main controller 118 with the processor 304, the main controller 118 controls the variable frequency modular units (112.1, 112.2, ..., 112.N). Moreover, in order to adjust the air conditioning temperature, the memory 318 also stores target fluid temperature and current temperature values, where the target fluid temperature is represented by the symbol $T_w$.target, and the current temperature is represented by the symbol $T_w$.

Figure 4:
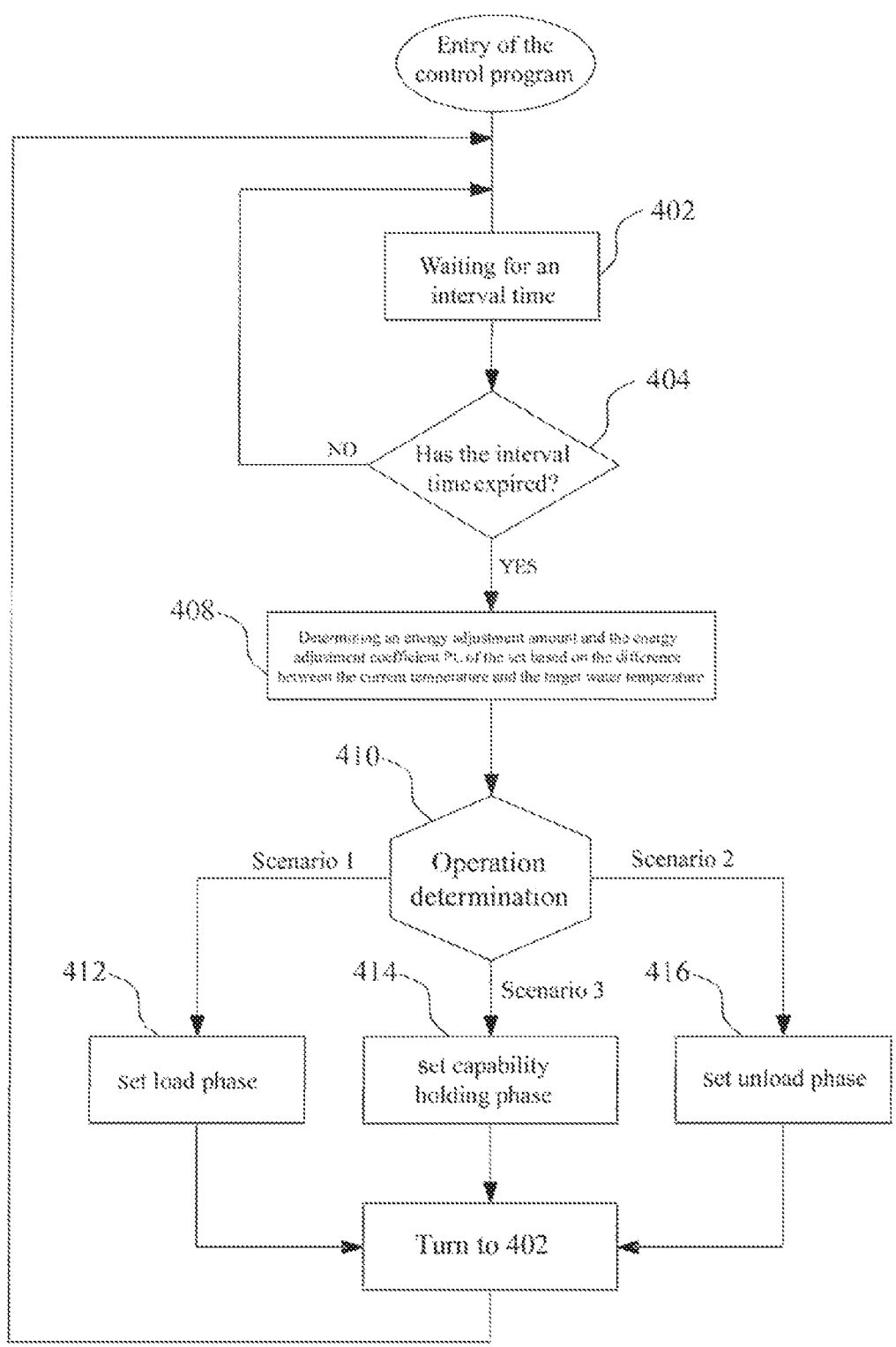
FIG. 4 is a control flow chart of an embodiment of an overall procedure for controlling the variable frequency modular units with the main controller of FIG. 3, in accordance with an aspect of the present disclosure.

FIG. 4 is a control flow chart showing a procedure performed by the main controller 118 for controlling the variable frequency modular units (112.1, 112.2, ..., 112.N). As illustrated at block 402 of FIG. 4, the processor 304 delays for an interval time. In block 404, the processor 304 determines whether the interval time has expired. If the interval time has not expired, the processor 304 will return to block 402. When the processor 304 determines that the interval time has expired, the processor 304 proceeds to block 408.

At block 408, the processor 304 of the main unit 112.2 receives feedback indicative of the current temperature, Tw, and the target fluid temperature, $T_w$.target, stored in the memory 318. The processor 304 utilizes the feedback to determine an energy adjustment amount of the modular set 102 based on the difference between the current temperature, $T_w$, and the target fluid temperature, $T_w$.target. Additionally, the processor 304 of the main unit 112.2 compares the current temperature, $T_w$, detected in the present period with the current temperature detected in the previous period to calculate a rate of change of the water temperature. The rate of change may determine an energy modulation coefficient, PL. For instance, the memory 318 may include several ranges for the rate of change, where each range includes a load or unload ratio subject to different modification coefficients, c, which may be used to determine the energy adjustment coefficient, PL, of the variable frequency modular set 102. The energy modulation coefficient, PL, is determined by multiplying the load ratio or unload ratio (e.g., determined based on the temperature difference between the current temperature, $T_w$, and the target fluid temperature, $T_w$.target) by the modification coefficient, c.

In some embodiments, the target fluid temperature, $T_w$.target, is a set value input to the processor 304, while the current temperature, $T_w$, is detected by the sensor 108. For example, the target fluid temperature, $T_w$.target, may be between 5° C. and 20° C. The sensor 108 provides the detected current temperature, $T_w$, to the processor 304. Upon receiving the temperature, $T_w$, the processor 304 stores it in the memory 318. The sensor 108 measures the current temperature, $T_w$, of the fluid in the conduit 110 by using a thermal conductivity of water. As an example, the sensor 108 may be placed within the conduit 110 to contact the fluid flowing through the conduit 110, thereby measuring the current temperature, $T_w$, of the fluid in the conduit 110.

In an embodiment of the present disclosure, the energy adjustment amount is represented by a percentage of an adjustment load ratio corresponding to the energy adjustment amount to the total load ratio of the variable frequency modular set 102. The energy adjustment amount of each variable frequency modular unit is represented by a percentage of the adjustment load ratio corresponding to the energy adjustment amount of each variable frequency modular unit to the total load ratio of the variable frequency modular units.

At block 410, the processor 304 performs operation determination, and the control procedure sets a load phase 412, sets an unload phase 416, or sets a capacity holding phase 414, respectively, based on three different scenarios (i.e., scenario 1, scenario 2, or scenario 3).

At block 410, the processor 304 determines which scenario to apply based on various criteria. For instance, scenario 1 may be selected when $T_w$-$T_w$.target>D in a refrigeration working condition, or when $T_w$.target-$T_w$>D in a heating working condition, thereby setting the load phase. As used herein, the value, D, is set according to an accuracy level of water temperature control. In some embodiments, the value D may be between 1 and 3. Scenario 2 may be selected when $T_w$-$T_w$.target<-D in the refrigeration working condition, or when $T_w$.target-$T_w$<-D in the heating working condition, thereby setting the unload phase. Scenario 3 may be selected when -D≤$T_w$-$T_w$.target≤D in the refrigeration working condition, or when -D≤$T_w$.target-$T_w$≤D in the heating working condition, thereby setting the capacity holding phase. Further, the load ratio of the variable frequency modular set 102 in a load area is set to a large load ratio, the load ratio/unload ratio of the variable frequency modular set 102 in a fine-tuning area is set to a small load ratio or a small unload ratio, and the unload ratio of the variable frequency modular set 102 in the unload area is set to a large unload ratio.

In an embodiment of the present disclosure, the load ratio or the unload ratio is represented by a percentage of the adjustment load ratio to the total load ratio of the variable frequency modular set 102. The load ratio and the unload ratio of each variable frequency modular unit are represented by a percentage of the adjustment load ratio of the respective variable frequency modular unit to the total load ratio of the respective variable frequency modular unit.

To set the load phase at block 412, the processor 304 applies a frequency load to the selected (or already operating) variable frequency modular units in the variable frequency modular set 102 and/or starts an unactuated variable frequency modular unit by applying a frequency load or frequency unload to the selected variable frequency modular unit (including the recently started variable frequency modular unit and the operating variable frequency modular units). The processor 304 determines the frequency load or frequency unload based on a calculated average operating frequency. The processor 304 compares the calculated average operating frequency to the current operating frequency and determines the frequency load or frequency unload based on the comparison. If the calculated average operating frequency is greater than the current operating frequency, a frequency load is applied to the selected variable frequency modular units, as shown at block 412. If the average operating frequency is less than the current operating frequency, a frequency unload is applied to the selected variable frequency modular units, as shown at block 416.

At block 416, a frequency unload is applied to the selected (already operating) variable frequency modular units in the variable frequency modular set 102. Alternatively, a frequency unload is applied to an already operating variable frequency modular unit and a frequency load or a frequency unload is applied to the selected (not including the recently unloaded variable frequency modular unit) operating variable frequency modular units. As discussed above, the frequency load or the frequency unload is based on the comparison of the calculated average operating frequency to the current operating frequency. If the calculated average operating frequency is greater than the current operating frequency, the frequency load is applied to the selected variable frequency modular units, as shown in block 412. If the average operating frequency is less than the current operating frequency, a frequency unload is applied to the selected variable frequency modular units, as shown in block 416.

At block 414, a frequency adjustment command is transmitted to one or more of the variable frequency modular units. Specifically, the frequency adjustment command is transmitted to variable frequency modular units that include load ratios deviating from the average load ratio and are among the selected (already operating) variable frequency modular units of the variable frequency modular set 102.

Upon completion of blocks 412, 414, or 416, the processor 304 returns to block 402 to await for the periodic interval time to expire before a next period of adjustment is performed.

Figure 5:
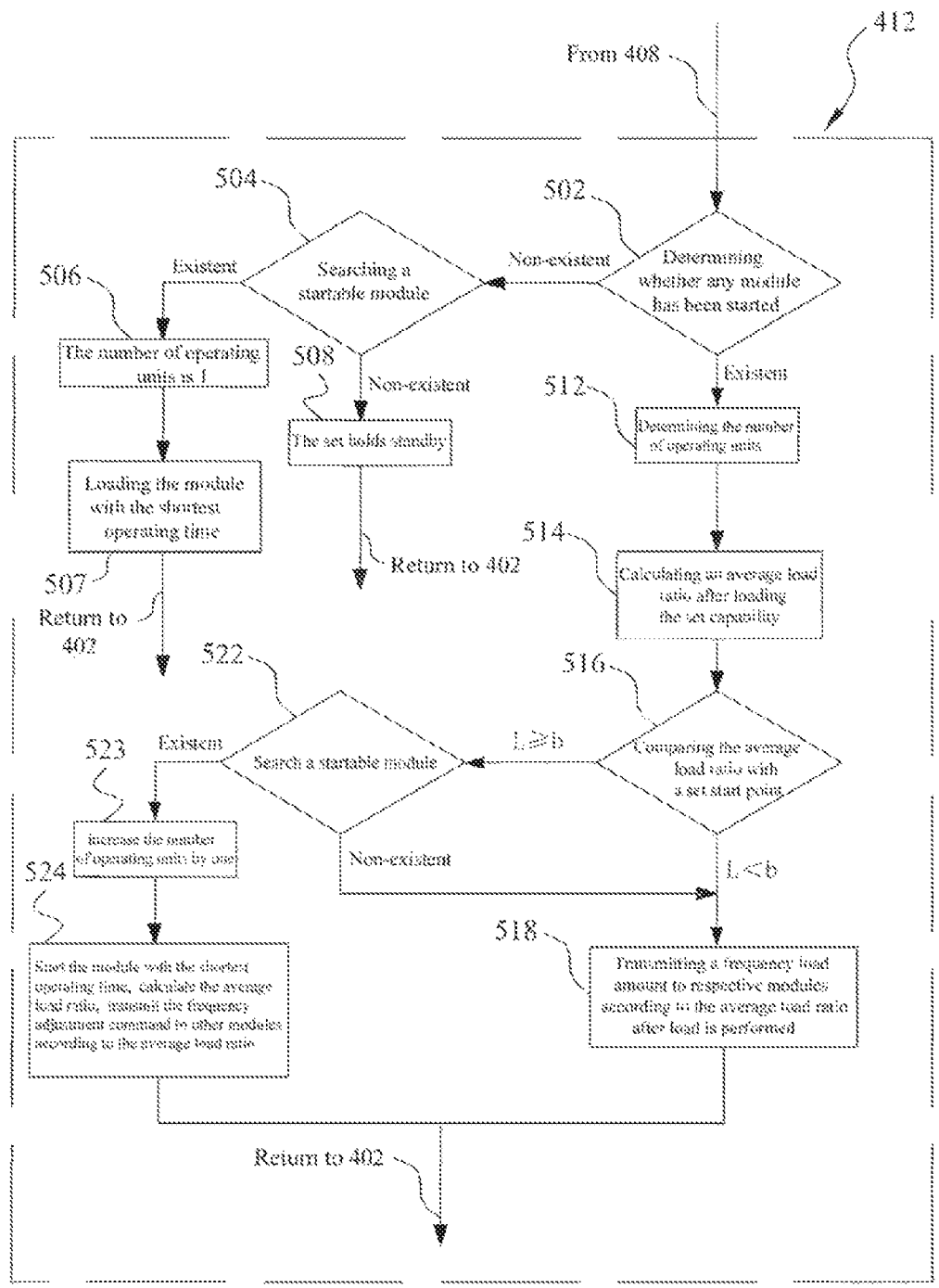
FIG. 5 is a control flow chart of an embodiment of a set load procedure of the overall procedure of FIG. 4, in accordance with an aspect of the present disclosure.

FIG. 5 is a control flow chart that illustrates the set load procedure of block 412 of FIG. 4. For example, at block 502, the processor 304 determines whether any variable frequency modular units have been started. If none of the variable frequency modular units have been started, the processor 304 continues to block 504. If any of the variable frequency modular units have been started, the processor 304 continues to block 512.

At block 512, the processor 304 determines the number of variable frequency modular units participating in operation. The number of variable frequency modular units in operation may be utilized for calculating the average load ratio of each variable frequency modular unit participating in operation after a load is performed. At block 514, the processor 304 calculates a total load ratio of the variable frequency modular units participating in operation after the load is performed. As used herein, the total load ratio refers to a sum of each load ratio of the variable frequency modular units participating in operation and the energy adjustment amount. The total load ratio (after load is performed) may be divided by the number of variable frequency modular units participating in operation, thereby calculating the average load ratio after the load is performed. Once the processor 304 determines the average load ratio, the processor 304 continues to block 516.

At block 516, the processor 304 compares the average load ratio after the load is performed with a start point of the variable frequency modular set 102. If the average load ratio after the load is performed is greater than or equal to the start point of the variable frequency modular set, the processor 304 continues to block 522. If the average load ratio after the load is performed is less than the start point of the variable frequency modular set 102, the processor 304 continues to block 518.

At block 522, the processor 304 searches for a startable (e.g., inactive) variable frequency modular unit. If the processor 304 discovers the startable variable frequency modular unit, the processor 304 continues to block 523. If the processor 304 does not find the startable variable frequency modular unit, the processor 304 continues to block 518. At block 518, the processor 304 transmits a frequency load amount to respective operating variable frequency modular units based on the average load ratio after the load is performed, where the average load ratio is calculated at block 514.

It should be noted that, the processor 304 will execute block 518 after completion of the blocks 516 and/or 522. In other words, block 518 may be performed after either block 516 or block 522. When the processor 304 continues from block 516 to block 518 and/or continues from block 522 to block 518, the processor 304 again determines the average load ratio. For instance, the processor 304 determines the total load ratio (after load is performed) by summation of each load ratio of the variable frequency modular units participating in operation and the energy adjustment amount. The total load ratio is divided by the number of variable frequency modular units participating in operation, thereby obtaining the average load ratio after the load is performed. After completing block 518, the processor 304 may return to step 402.

At block 523, the processor 304 increases the number of the operating variable frequency modular units by one unit. The processor 304 may then continue to block 524. At block 524, the processor 304 starts a variable frequency modular unit with a shortest time of participation in operation. The processor 304 then calculates the total load ratio after the load is performed by summation of each load ratio of the variable frequency modular units participating in operation and the energy adjustment amount. The total load ratio is divided by the number of selected variable frequency modular units (including the recently started variable frequency modular unit and the operating variable frequency modular units) to obtain an average load ratio after the load is performed. The load/unload is performed by the processor 304 based on the average load ratio after the load is performed. For instance, the processor 304 applies a frequency load or a frequency unload to the selected variable frequency modular units depending on whether the calculated average operating frequency is greater than the current operating frequency or lower than the current operating frequency. If the calculated average operating frequency is greater than the current operating frequency, the processor 304 applies the frequency load to the selected variable frequency modular units. If the average operating frequency is less than the current operating frequency, the processor 304 applies the frequency unload to the selected variable frequency modular units. After block 524 is complete, the processor 304 may return to block 402.

As discussed above, at block 502, the processor 304 determines if any of the variable frequency modular units have been started. If none of the variable frequency modular units have been started, the processor 304 continues to block 504. At block 504, the processor 304 searches for a startable variable frequency modular unit. If the processor does not discover the startable variable frequency modular unit, the processor 304 continues to block 508. If a startable variable frequency modular unit is found at block 504, the processor 304 continues to block 506.

At block 506, the processor 304 records the number of operating variable frequency modular units as one, and then the processor 304 continues to block 507. At block 507, the processor 304 loads a start load ratio to the variable frequency modular unit with the shortest operating time. Subsequently, the processor 304 returns to block 402. At block 508, the variable frequency modular unit operates in standby and makes a determination via error determination logic. The processor 304 then returns to block 402.

Figure 6:
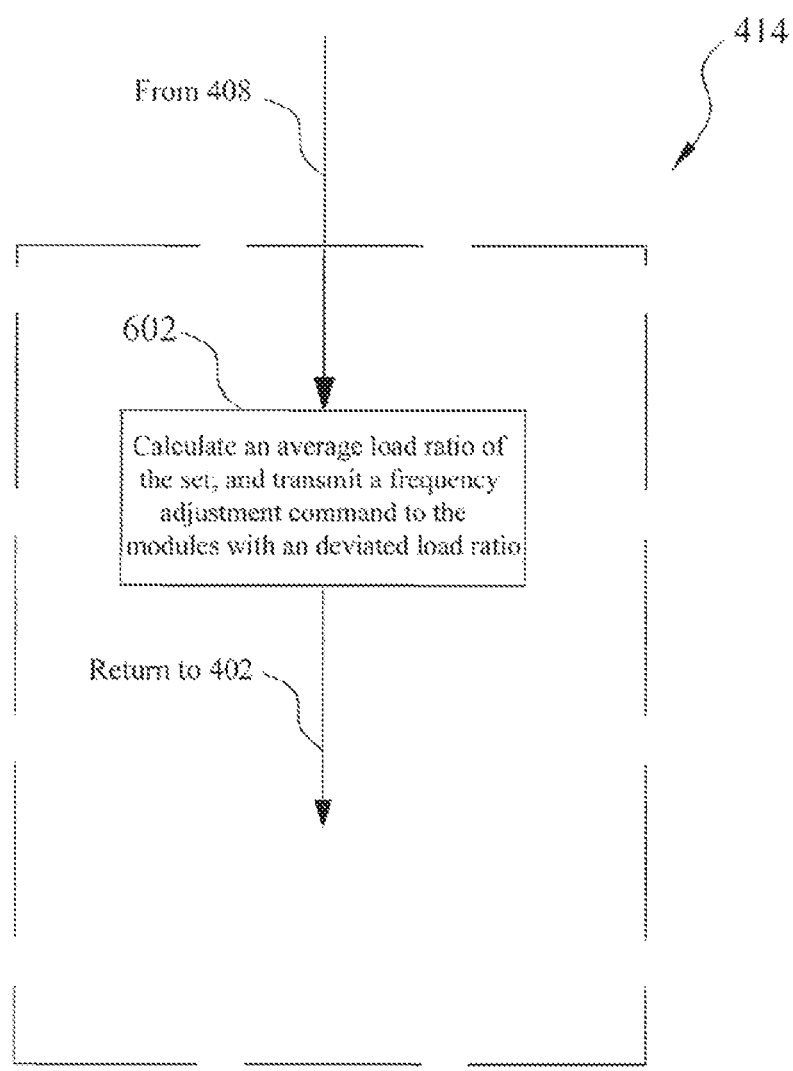
FIG. 6 is a control flow chart of an embodiment of a set capability holding procedure of the overall procedure of FIG. 4, in accordance with an aspect of the present disclosure.

FIG. 6 is a control flow chart of the set capacity hold procedure of block 414 of FIG. 4. At block 602, the processor 304 sums each load ratio of the variable frequency modular units participating in operation to obtain a total load ratio. The processor divides the total load ratio by the number of variable frequency modular units participating in operation to obtain an average load ratio. The processor 304 may calculate a new average operating frequency based on the average load ratio, compare the newly calculated average operating frequency with the operating frequency of each variable frequency modular units participating in operation, and transmit a frequency adjustment command to the variable frequency modular units participating in operation that deviate from the newly calculated average operating frequency. If the newly calculated average operating frequency is greater than the current operating frequency for a respective variable frequency modular unit, the processor 304 applies a frequency load to the respective variable frequency modular unit. If the average operating frequency is less than the current operating frequency of the respective variable frequency modular unit, the processor 304 applies a frequency unload to the respective variable frequency modular unit. After completion of block 602, the processor 304 may return to block 402.

It should be noted that the load ratio of each variable frequency modular unit participating in operation may be dynamically varied during operation, such that the load ratios of the variable frequency modular units are different from one another. The load ratios of the variable frequency modular units participating in operation are adjusted to be maintained to compensate for load ratio deviation generated dynamically during operation of each variable frequency modular unit. Accordingly, at block 602, the processor 304 optimizes operation of the variable frequency modular set 102.

Figure 7:
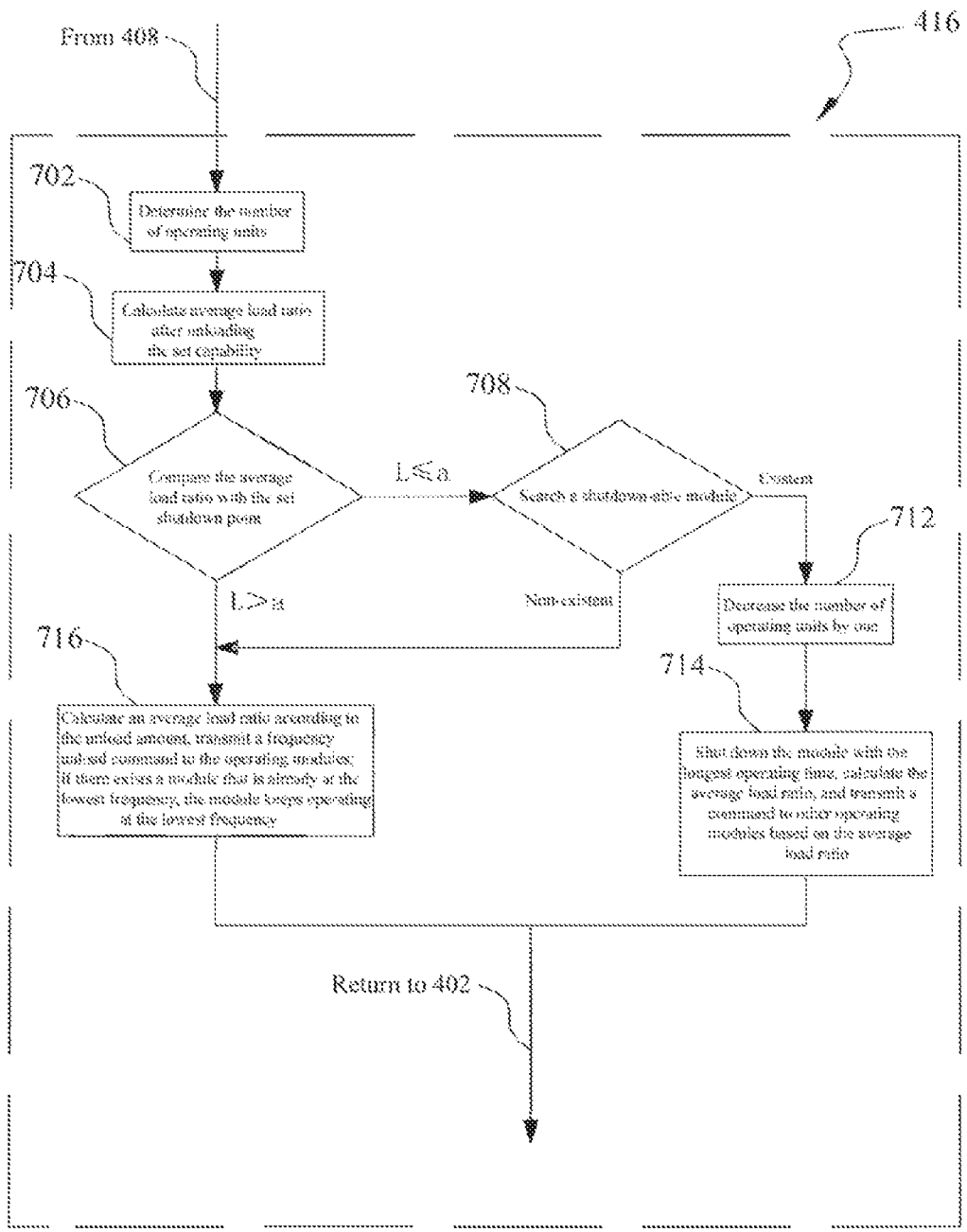
FIG. 7 is a control flow chart of an embodiment of a set unload procedure of the overall procedure of FIG. 4, in accordance with an aspect of the present disclosure.

FIG. 7 is a control flow chart of the unload phase of block 416 of FIG. 4. For example, at block 702, the processor 304 determines the number of variable frequency modular units participating in operation to calculate an average load ratio of each variable frequency modular unit participating in operation after the unload is performed. The processor 304 continues to block 704.

At block 704, the processor 304 calculates a total load ratio of the variable frequency modular units participating in operation after the unload is performed. At block 704, the total load ratio is determined by summing each load ratio of the variable frequency modular units participating in operation and subtracting the energy adjustment amounts. The total load ratio is divided by the number of variable frequency modular units participating in operation to obtain an average load ratio after the unload is performed. The processor 304 then continues to block 706.

At block 706, the processor compares the average load ratio (after the unload is performed) with a shutdown point of the variable frequency modular set 102. If the average load ratio after the unload is performed less than or equal to the shutdown point of the variable frequency modular set 102, the processor 304 continues to block 708. If the average load ratio after the unload is performed greater than the shutdown point of the variable frequency modular set 102, the processor 304 continues to block 716.

At block 708, the processor 304 searches for a variable frequency modular unit that may be shutdown. If the processor 304 discovers a variable frequency modular unit that is able to shutdown, the processor 304 continues to block 712. If the processor 304 cannot find a variable frequency modular unit that is able to be shutdown, the processor 304 continues to block 716.

At block 716, the processor 304 transmits the frequency unload amount to respective operating variable frequency modular units. The frequency unload amount is based on the average load ratio (after the unload is performed) calculated at block 704. If a variable frequency modular unit is already operating at a lower frequency than the remaining, currently operating variable frequency modular units, that variable frequency modular unit continues operating at the lowest frequency. Upon completion of block 716, the processor 304 continues to block 402.

It should be noted that the processor 304 executes block 716 upon completion of the blocks 706 and/or 708. In other words, the processor 304 may execute block 716 after completing either block 706 or block 708. When the processor 304 continues from either block 706 or block 708 to block 716, the processor 304 may also obtain the total load ratio (after the unload is performed). As discussed above, the total load ratio is the sum of each load ratio of the variable frequency modular units participating in operation minus the energy adjustment amounts. The total load ratio (after the unload is performed) is divided by the number of variable frequency modular units participating in operation to obtain the average load ratio after the unload is performed. After completing block 716, the processor 304 may return to block 402.

As discussed above, at block 708, if the processor 304 discovers a variable frequency modular unit that is able to be shutdown, the processor 304 continues to block 712. At block 712, the processor 304 decreases the number of operating variable frequency modular units by one. Subsequently, the processor 304 may continue to block 714.

At block 714, the processor 304 unloads a variable frequency modular unit that has been operating longer than the remaining variable frequency modular units. Further, the processor calculates the total load ratio after the unload is performed. As discussed above, the total load ratio is determined by adding each load ratio of the variable frequency modular units participating in operation and subtracting the energy adjustment amounts. The total load ratio (after the unload is performed) is divided by the number of selected variable frequency modular units (not including the recently unloaded variable frequency modular unit and the non-started variable frequency modular units) to obtain an average load ratio after the unload is performed. The processor 304 applies a frequency load or a frequency unload to the selected variable frequency modular units based on the average load ratio and/or a comparison of a calculated average operating frequency to the current operating frequency. For example, when the calculated average operating frequency is greater than the current operating frequency, the processor 304 applies a frequency load to the selected variable frequency modular units. When the calculated average operating frequency is less than the current operating frequency, the processor 304 applies a frequency unload to the selected variable frequency modular units. Upon completion of block 714, the processor 304 may return to block 402.

Figure 8:
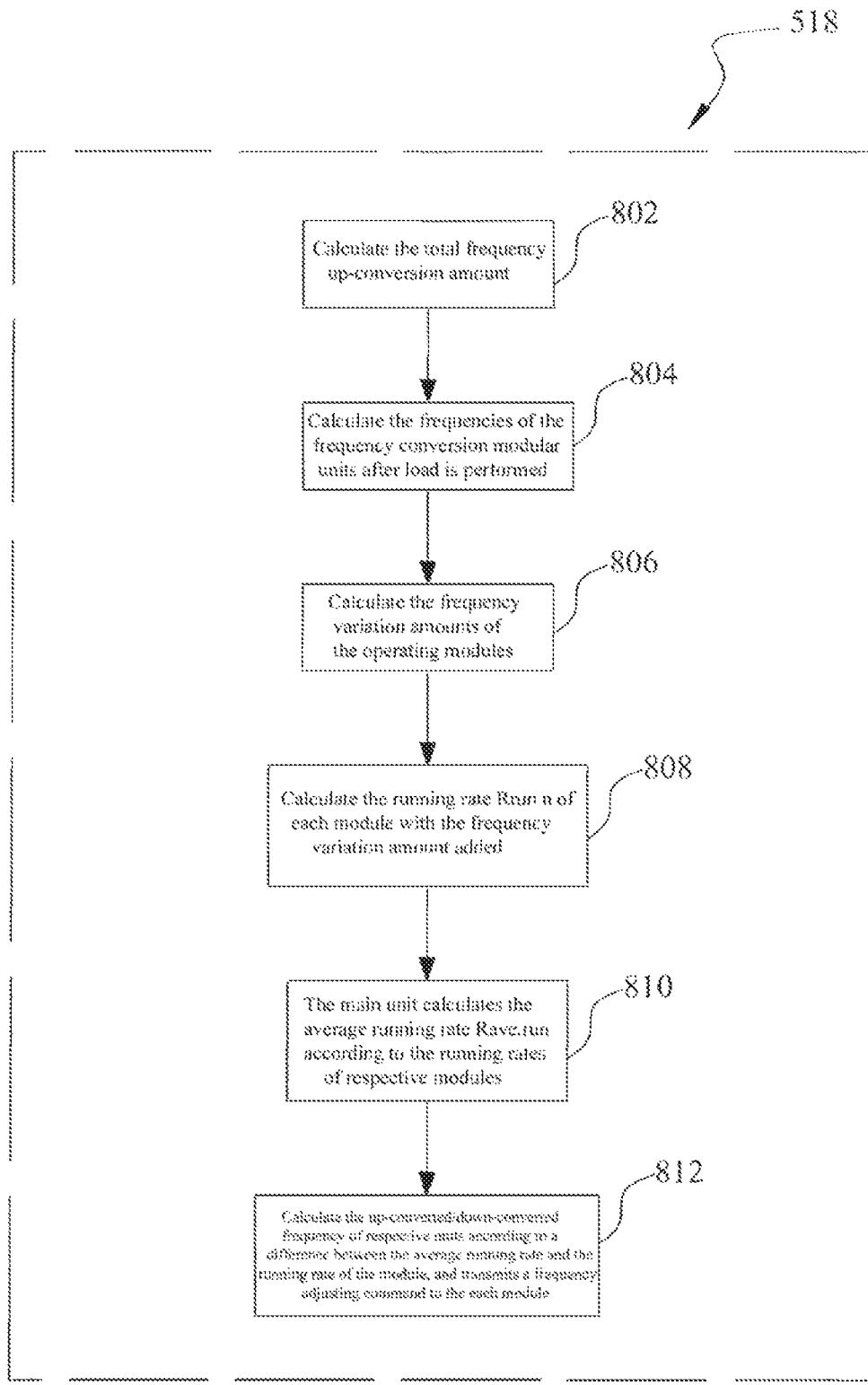
FIG. 8 is a control flow chart of an embodiment of a process for transmitting a frequency load amount to each variable frequency modular unit, in accordance with an aspect of the present disclosure.

FIG. 8 is a control flow chart of block 518 of FIG. 5. For instance, at block 802, the processor 304 adds the frequencies of loadable variable frequency modular units of the variable frequency modular set 102 to obtain a total frequency, $\Sigma L$, of the loadable variable frequency modular units of the variable frequency modular set 102. The processor 304 utilizes the total frequency to calculate the total frequency up-conversion amount of the variable frequency modular set 102 by multiplying the energy adjustment coefficient, PL, calculated at block 408 by the total frequency, ΣL, of the loadable variable frequency modular units. Upon determination of the total frequency, the processor 304 may continue to block 804.

At block 804, the processor 304 divides the total frequency up-conversion amount of the variable frequency modular set 102 by the number of selected (already operating) variable frequency modular units to obtain the frequency of each selected (already operating) variable frequency modular unit after the load is performed. At block 806, the processor 304 subtracts the current operating frequency from the frequency of each selected (already operating) variable frequency modular unit after the load is performed to obtain a frequency variation amount of each selected (already operating) variable frequency modular unit. At block 808, the processor 304 calculates a running rate, Rrun.n, of each selected (already operating) variable frequency modular unit after the load is performed. At block 810, the processor 304 adds the running rates of each selected (already operating) variable frequency modular unit and divides the sum by the number of selected (already operating) variable frequency modular units to obtain an average running rate, Rave.run. At block 812, the processor 304 calculates an up-converted/down-converted frequency of each selected (already operating) variable frequency modular unit according to a difference between the average running rate, Rave.run, and the respective running rate of each selected (already operating) variable frequency modular unit. The processor 304 then transmits a frequency adjusting command to each selected (already operating) variable frequency modular unit. In other words, a final, varied frequency of each selected (already operating) variable frequency modular unit may be determined by Equation 3.

$$\Delta fn = fmaxn * Rave.run - frun. \quad (3)$$

In this formula, fmaxn denotes a threshold load frequency of each variable frequency modular unit, Rave.run denotes an average running rate, and frun denotes a current operating frequency of the respective variable frequency modular unit. Upon completion of block 812, block 518 is completed, and the processor 304 may return to block 402.

Figure 9:
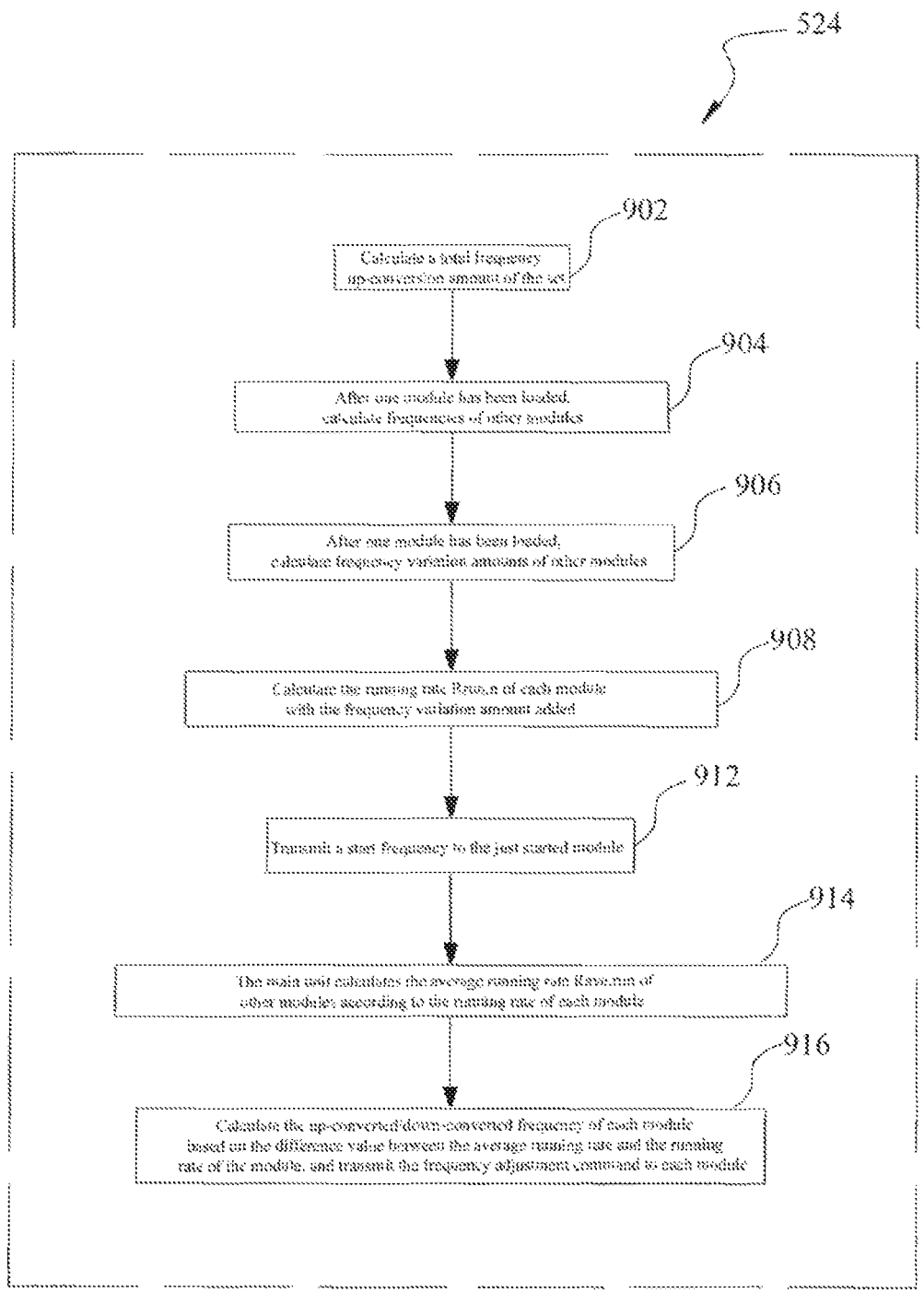
FIG. 9 is a control flow chart of an embodiment of a process for transmitting a frequency load/unload amount to each variable frequency modular unit, in accordance with an aspect of the present disclosure.

FIG. 9 is a control flow chart of block 524 of FIG. 5. For example, at block 902, the processor 304 adds the frequencies of loadable variable frequency modular units of the variable frequency modular set 102 to obtain the total frequency of the loadable variable frequency modular units of the variable frequency modular set 102. The total frequency of the loadable variable frequency modular units of the variable frequency modular set 102 is denoted by a symbol, ΣL. The processor 304 multiplies ΣL by PL calculated in step 408 to determine the total frequency up-conversion amount of the variable frequency modular set 102.

At block 904, the processor 304 subtracts the frequency of the recently started variable frequency modular unit from the total frequency up-conversion amount of the variable frequency modular set 102 and divides the result by the number of selected (not including the recently started variable frequency modular unit) already operating variable frequency modular units. The processor thus determines a frequency of the selected (not including the recently started variable frequency modular unit) already operating variable frequency modular units after the load is performed.

At block 906, the processor 304 subtracts the current operating frequency from the frequency of the selected (not including the recently started variable frequency modular units) already operating variable frequency modular units after the load is performed. At block 908, the processor 304 calculates a running rate, Rrun.n, of each selected (not including the recently started variable frequency modular units) already operating variable frequency modular unit after the load or the unload is performed. At block 912, the processor 304 transmits a starting frequency to the recently started variable frequency modular unit. At block 914, the processor 304 adds the running rates of the selected (not including the recently started variable frequency modular units) already operating variable frequency modular units and divides the result by the number of selected (not including the recently started variable frequency modular units) already operating variable frequency modular units. As such, the processor determines an average running rate, Rave.run. At block 916, the processor 304 calculates the up-converted/down-converted frequency of each selected (not including the recently started variable frequency modular units) already operating variable frequency modular unit based on the difference between the average running rate, Rave.run, and the running rate of each selected (not including the recently started variable frequency modular units) already operating variable frequency modular unit, and transmits a frequency adjustment command to each selected (not including the recently started variable frequency modular units) variable frequency modular unit.

In other words, the final, varied frequency of each selected (not including the recently started variable frequency modular units) variable frequency modular unit is represented by Equation 3 above. Upon completion of block 916, block 524 is completed, and the processor 304 may return to block 402.

Figure 10:
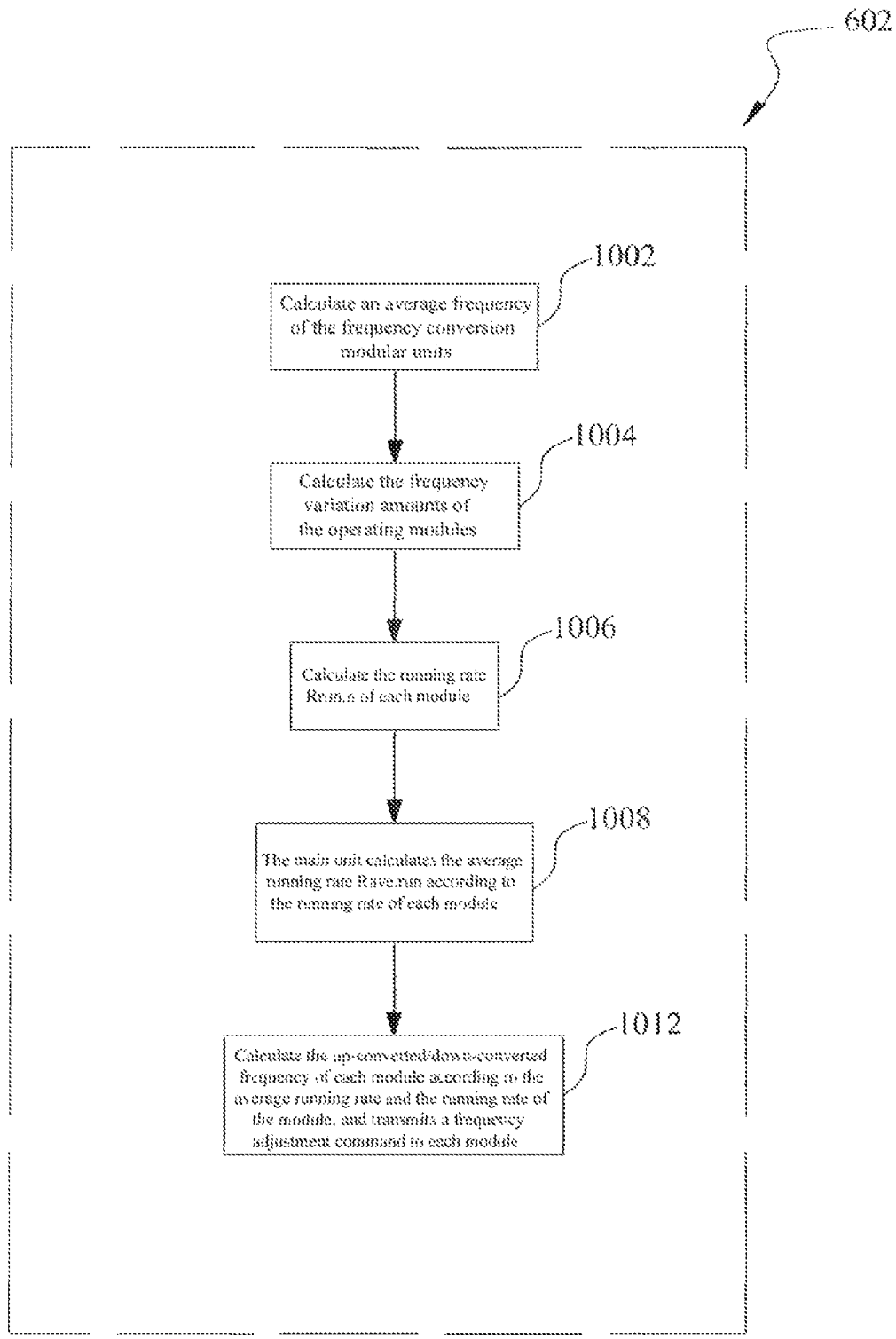
FIG. 10 is a control flow chart of an embodiment of a process for transmitting a frequency load/unload amount to each variable frequency modular unit, in accordance with an aspect of the present disclosure.

FIG. 10 is a control flow chart of block 602 of FIG. 6. For instance, at block 1002, the processor 304 adds the frequencies of the selected (already operating) variable frequency modular units of the variable frequency modular set 102 to obtain the total frequency of the selected (already operating) variable frequency modular units. The processor then divides the total frequency of the selected (already operating) variable frequency modular units by the number of the selected (already operating) variable frequency modular units to obtain an average frequency of each selected (already operating) variable frequency modular unit. At block 1004, the processor 304 subtracts the current operating frequency from the average frequency of each selected (already operating) variable frequency modular unit to obtain a frequency variation amount of each selected (already operating) variable frequency modular unit. At block 1006, the processor 304 calculates the running rate, Rrun.n, of each selected (already operating) variable frequency modular unit after the load or the unload is performed. At block 1008, the processor 304 adds the running rates of the selected (already operating) variable frequency modular units and divides the result by the number of selected (already operating) variable frequency modular units to obtain an average running rate, Rave.run. At block 1012, the processor 304 calculates the up-converting/down-converting frequency of each selected (already operating) variable frequency modular unit based on the difference between the average running rate, Rave.run, and the running rate of each selected (already operating) variable frequency modular unit. The processor 304 then transmits a frequency adjustment command to each selected (already operating) variable frequency modular unit. In other words, the final, varied frequency of each selected (already operating) variable frequency modular unit is represented by Equation 3 above. Upon completion of block 1012, block 602 is completed, and the processor 304 may return to block 402.

Figure 11:
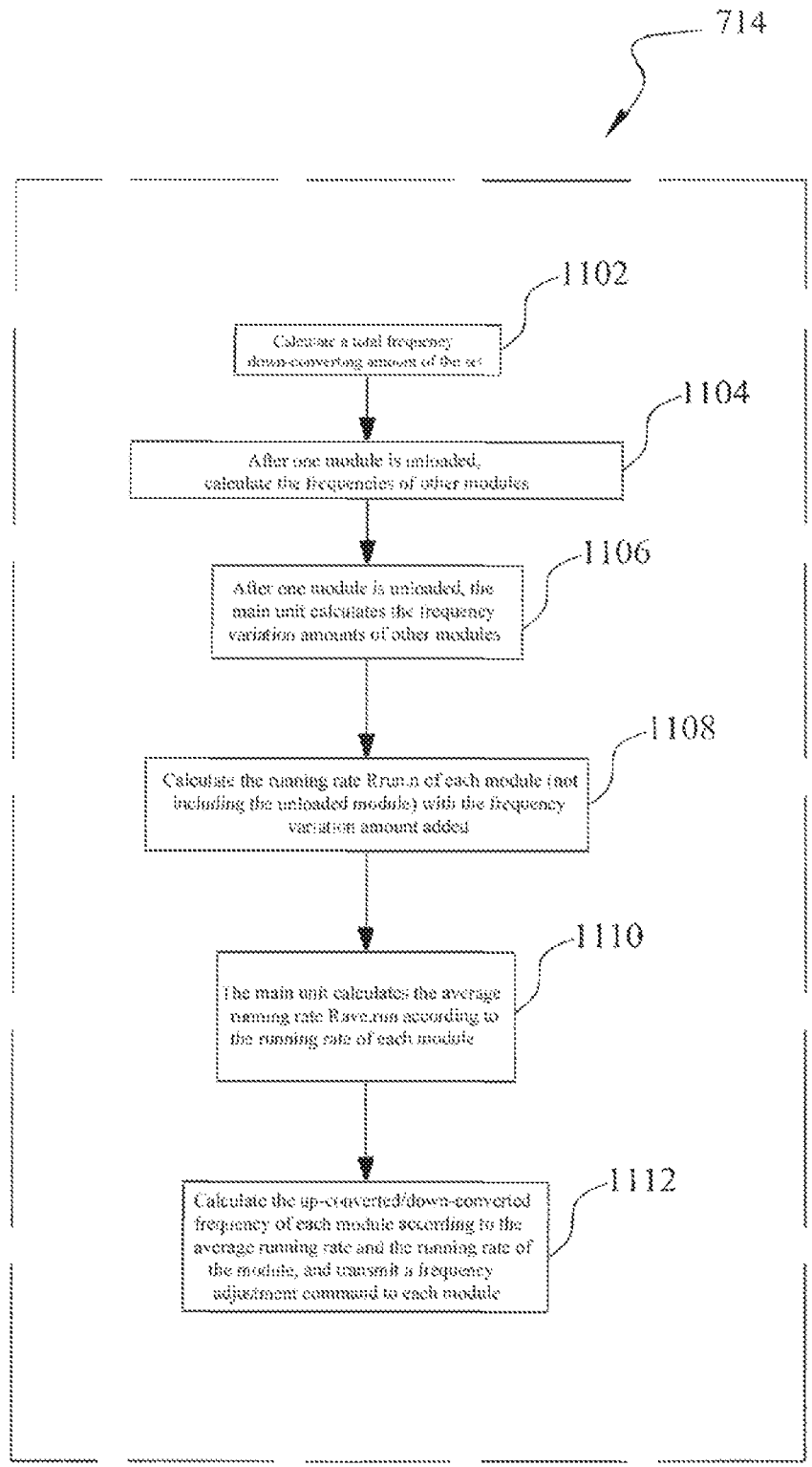
FIG. 11 is a control flow chart of an embodiment of a process for transmitting a frequency load/unload amount to each variable frequency modular unit, in accordance with an aspect of the present disclosure.

FIG. 11 is a control flow chart of block 714 of FIG. 7. For instance, at block 1102, the processor 304 adds the frequencies of the loadable variable frequency modular units of the variable frequency modular set 102 to obtain a total frequency of the loadable variable frequency modular units of the variable frequency modular set 102. The total frequency of the loadable variable frequency modular units of the variable frequency modular set 102 is represented by the symbol ΣL. The processor 304 multiplies ΣL by PL calculated in block 408 to calculate the total frequency down-conversion amount of the variable frequency modular set 102. At block 1104, the processor 304 subtracts the total frequency down-converting amount from the total frequency down-converting amount of the selected (not including the unloaded variable frequency modular units) operating variable frequency modular units and divides the result by the number of the selected (not including the unloaded variable frequency modular units) operating variable frequency modular units. Accordingly, the processor 304 determines the frequency of the selected (not including the unloaded variable frequency modular units) operating variable frequency modular units after the unload is performed.

At block 1106, the processor 304 subtracts the current operating frequency from the frequencies of the selected (not including the unloaded variable frequency modular units) operating variable frequency modular units after the unload is performed to obtain a frequency variation amount. At block 1108, the processor 304 calculates the running rate, Rrun.n, of each selected (not including the unloaded variable frequency modular units) operating variable frequency modular unit after the unload is performed. At block 1110, the processor 304 adds the running rates of the selected (not including the unloaded variable frequency modular units) already operating variable frequency modular units and divides the result by the number of the selected (not including the unloaded variable frequency modular units) operating variable frequency modular units to obtain an average running rate, Rave.run.

At block 1112, the processor 304 calculates the up-converted/down-converted frequency of the remaining (not including the unloaded variable frequency modular unit) operating variable frequency modular units and transmits a frequency adjustment command to each selected (not including the unloaded variable frequency modular units) operating variable frequency modular unit. In some embodiments, the up-converted/down-converted frequency is based on a difference between the average running rate, Rave.run, and the running rate of each selected (not including the unloaded variable frequency modular units) operating variable frequency modular unit. In other words, the final, varied frequency of each selected (not including the unloaded variable frequency modular units) operating variable frequency modular unit is represented by Equation 3. After completion of block 1112, block 714 is completed, and the processor 304 may return to block 402.

Figure 12:
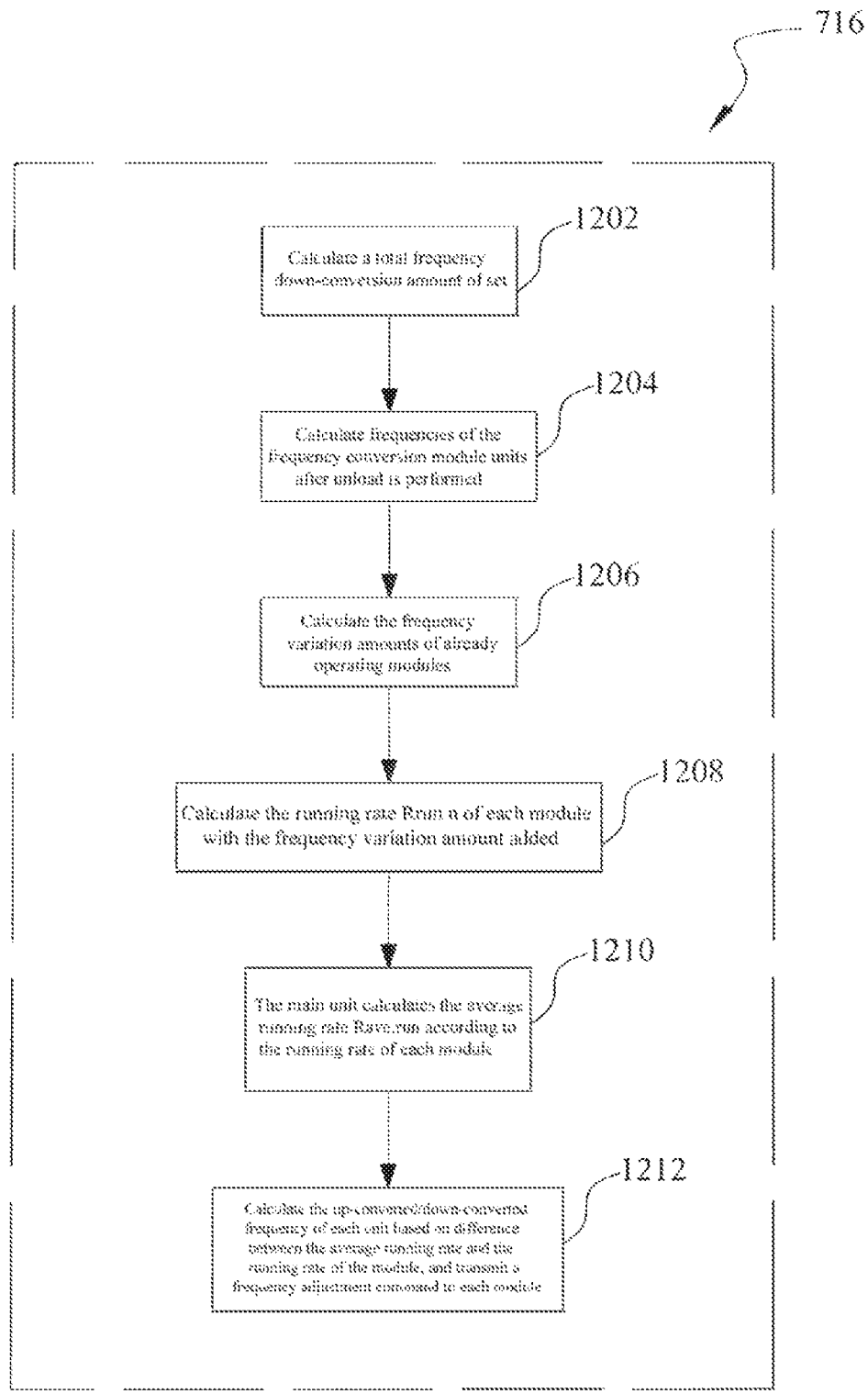
FIG. 12 is a control flow chart of an embodiment of a process for transmitting a frequency unload amount to each variable frequency modular unit, in accordance with an aspect of the present disclosure.

FIG. 12 is a control flow chart of block 716 of FIG. 7. For instance, at block 1202, the processor 304 adds the frequencies of the loadable variable frequency modular units of the variable frequency modular set 102 to obtain the total frequency of the loadable variable frequency modular units of the variable frequency modular set 102. The total frequency of the loadable variable frequency modular units of the variable frequency modular set 102 is represented by ΣL. The processor 304 multiplies ΣL by PL calculated at block 408 to calculate the total frequency down-conversion amount of the variable frequency modular set 102

At block 1204, the processor 304 divides the total frequency down-conversion amount of the variable frequency modular set 102 by the number of selected (already operating) variable frequency modular units to obtain the frequency of each selected (already operating) variable frequency modular unit after the unload is performed. At block 1206, the processor 304 subtracts the current operating frequency from the frequency of each selected (already operating) variable frequency modular unit after the unload is performed to obtain the frequency variation amount of each selected (already operating) variable frequency modular unit. At block 1208, the processor 304 calculates the running rate, Rrun.n, of each variable frequency modular unit after the unload is performed. At block 1210, the processor 304 adds the running rates of the selected (already operating) variable frequency modular units and divides the sum by the number of selected (already operating) variable frequency modular units to obtain an average running rate, Rave.run. At block 1212, the processor 304 calculates the up-converted/down-converted frequency of each selected (already operating) variable frequency modular unit based on the difference between the average running state, Rave.run, and the running rate of each selected (already operating) variable frequency modular unit. The processor 304 may then transmit a frequency adjustment command to each selected (already operating) variable frequency modular unit. In other words, the final, varied frequency of each selected (already operating) variable frequency modular unit is represented by Equation 3. Upon completion of block 1212, block 716 is completed, and the processor 304 may return to block 402.

Although only some features of the present disclosure have been illustrated and described, various improvements and variations may be made by those skilled in the art. Therefore, it should be understood that the appended claims intend to cover all improvements and variations falling within the substantive spirit scope of the present disclosure.

The invention claimed is:

1. A method for controlling an air conditioning system, the air conditioning system comprising a modular set that includes a plurality of variable frequency modular units, wherein the method comprises:
   setting a target load ratio range for each of the plurality of variable frequency modular units, wherein an operating energy efficiency of each of the plurality of variable frequency modular units is greater than or equal to a predetermined energy efficiency value within the target load ratio range;
   inputting an energy adjustment amount; and
   setting different operations for the modular set based on the energy adjustment amount, wherein the different operations for the modular set comprise a load phase and an unload phase;
   wherein, during the load phase, an operating frequency of a corresponding variable frequency modular unit of the plurality of variable frequency modular units is increased by a first respective frequency adjustment amount, wherein the first respective frequency adjustment amount is determined based on the energy adjustment amount and an operating position of the corresponding variable frequency modular unit within the target load ratio range;

wherein, during the unload phase, the operating frequency of the corresponding variable frequency modular unit of the plurality of variable frequency modular units is reduced by a second respective frequency adjustment amount, wherein the second respective frequency adjustment amount is determined based on the energy adjustment amount and the operating position of the corresponding variable frequency modular unit within the target load ratio range; and wherein the load phase or the unload phase causes the plurality of variable frequency modular units to operate within the target load ratio range after the load phase or the unload phase is performed.

2. The method of claim 1, wherein setting the different operations for the modular set further comprises a holding phase, wherein, during the holding phase, each of the operating variable frequency modular units is fine-tuned based on an average load ratio of the plurality of variable frequency modular units, and wherein the holding phase causes the plurality of variable frequency modular units to maintain operation within the target load ratio range.

3. The method of claim 2, wherein each of the plurality of variable frequency modular units is in fluid communication with a conduit, wherein the conduit is configured to receive a fluid for temperature adjustment, and wherein the method further comprises:
detecting and inputting a target temperature of the fluid, represented by the symbol Tw.target; and
detecting and inputting a current temperature of the fluid, represented by the symbol Tw; and
wherein inputting the energy adjustment amount of the modular set comprises obtaining the energy adjustment amount based on a difference between the target temperature of the fluid and the current temperature of the fluid.

4. The method of claim 3, wherein the target load ratio range comprises a minimum value, a, and a maximum value, b, and wherein the load phase comprises:
calculating an average load ratio of each operating variable frequency modular unit of the plurality of variable frequency modular units after the load phase is performed based on the energy adjustment amount;
comparing the average load ratio after the load phase is performed with b;
searching for a variable frequency modular unit not operating when the average load ratio after the load phase is performed is greater than or equal to b;
starting the variable frequency modular unit not operating if the variable frequency modular unit not operating is found;
calculating an average load ratio of a recently started operating variable frequency modular unit and operating variable frequency modular units;
transmitting a frequency adjustment command to the recently started operating variable frequency modular unit and the operating variable frequency modular units; and
calculating an average load ratio of the plurality of variable frequency modular units and transmitting a frequency adjustment command to the operating variable frequency modular units when the average load ratio after the load phase is performed is less than b, or the average load ratio after the load phase is performed is greater than or equal to b and the variable frequency modular unit not operating is not found.

5. The method of claim 4, wherein transmitting the frequency adjustment command to the recently started operating variable frequency modular unit and the operating variable frequency modular units comprises:
calculating a total frequency of loadable variable frequency modular units of the plurality of variable frequency modular units of the modular set;
determining an energy adjustment coefficient of the modular set based on a load ratio and a fluid temperature variation correction coefficient;
calculating a total frequency up-conversion amount based on the total frequency of the loadable variable frequency modular units and the energy adjustment coefficient;
calculating frequencies of the recently started operating variable frequency modular unit and the operating variable frequency modular units after the load phase is performed based on the total frequency up-conversion amount;
calculating frequency variation amounts based on differences between the frequencies of the recently started operating variable frequency modular unit and the operating variable frequency modular units after the load phase is performed and a current operating frequency;
calculating running rates of the operating variable frequency modular units after the load phase is performed;
calculating an average running rate of the operating variable frequency modular units other than the recently started variable frequency modular unit based on the running rates of the operating variable frequency modular units after the load phase is performed;
calculating an up-converted/down-converted frequency based on a difference between the average running rate and the running rate of each of the operating variable frequency modular units other than the recently started variable frequency modular unit; and
transmitting the frequency adjustment command to each of the operating variable frequency modular units other than the recently started variable frequency modular unit.

6. The method of claim 4, wherein transmitting the frequency adjustment command to the operating variable frequency modular units comprises:
calculating a total frequency of loadable variable frequency modular units of the plurality of variable frequency modular units of the modular set;
determining an energy adjustment coefficient of the modular set based on a load ratio and a fluid temperature change correction coefficient;
calculating a total frequency up-conversion amount based on the total frequency of the loadable variable frequency modular units and the energy adjustment coefficient;
calculating a frequency of the operating variable frequency modular units after the load phase is performed based on the total frequency up-conversion amount;
calculating frequency variation amounts based on difference values between the frequency of the operating variable frequency modular units after the load phase is performed and a current operating frequency;
calculating running rates of the operating variable frequency modular units after the load phase is performed;
calculating an average running rate of the operating variable frequency modular units after the load phase is performed based on the running rates of the operating variable frequency modular units after the load phase is performed;

calculating an up-converted/down-converted frequency based on a difference between the average running rate and the running rate of each of the operating variable frequency modular units after the load phase is performed; and transmitting the frequency adjustment command to each of the operating variable frequency modular units.

7. The method of claim 3, wherein the target load ratio range has a minimum value, a, and a maximum value, b, and wherein the load phase comprises:

calculating an additional average load ratio of each operating variable frequency modular unit of the plurality of variable frequency modular units after the unload phase is performed based on the energy adjustment amount;

comparing the average load ratio after the unload phase is performed with a;

searching for an additional variable frequency modular unit able to be shut down when the average load ratio after the unload phase is performed is less than or equal to a;

unloading the variable frequency modular unit able to be shut down and shutting down the variable frequency modular unit able to be shut down if the variable frequency modular unit able to be shut down is found;

calculating an average load ratio of the operating variable frequency modular units other than the variable frequency modular unit able to be shut down;

transmitting an additional frequency adjustment command to the operating variable frequency modular units other than the variable frequency modular unit able to be shut down;

calculating an additional average load ratio of the operating variable frequency modular units and transmitting a frequency adjustment command to the operating variable frequency modular units when the average load ratio after the unload phase is performed is greater than a, or when the average load ratio after the unload phase is performed less than or equal to a and the variable frequency modular unit able to be shut down is not found.

8. The method of claim 7, wherein unloading the variable frequency modular unit to be shut down comprises unloading a variable frequency modular unit that has been in operation longer than remaining variable frequency modular units of the plurality of variable frequency modular units.

9. The method of claim 7, wherein transmitting the frequency adjustment command to the operating variable frequency modular units comprises not adjusting the operating variable frequency modular units when the operating variable frequency modular units are at a threshold frequency, thereby causing the operating variable frequency modular units to continue operating at the threshold frequency.

10. The method of claim 7, wherein transmitting the frequency adjustment command to the operating variable frequency modular units other than the variable frequency modular unit able to be shutdown comprises:

calculating a total frequency of loadable variable frequency modular units of the plurality of variable frequency modular units of the modular set;

determining an energy adjustment coefficient of the modular set based on an unload ratio and a fluid temperature change correction coefficient;

calculating a total frequency down-conversion amount based on the total frequency of the loadable variable frequency modular units and the energy adjustment coefficient;

calculating a frequency of the operating variable frequency modular units other than the variable frequency modular unit able to be shut down after the unload phase is performed based on the total frequency down-conversion amount;

calculating frequency variation amounts based on difference values between the frequency of the operating variable frequency modular units after the unload phase is performed and a current operating frequency;

calculating running rates of the operating variable frequency modular units after the unload phase is performed;

calculating an average running rate of the operating variable frequency modular units other than the variable frequency modular unit able to be shut down based on the running rates of the operating variable frequency modular units after the unload phase is performed;

calculating an up-converted/down-converted frequency based on a difference between the average running rate and the running rate of each of the operating variable frequency modular units other than the variable frequency modular unit able to be shut down after the unload phase is performed; and transmitting the frequency adjustment command to each of the operating variable frequency modular units other than a recently started variable frequency modular unit.

11. The method of claim 7, wherein transmitting the frequency adjustment command to the operating variable frequency modular units comprises:

calculating a total frequency of loadable variable frequency modular units of the plurality of variable frequency modular units of the modular set;

determining an energy adjustment coefficient of the modular set based on a load ratio and a fluid temperature change correction coefficient;

determining a total frequency down-conversion amount based on the total frequency of the loadable variable frequency modular units and the energy adjustment coefficient;

calculating a frequency of the operating variable frequency modular units after the unload phase is performed based on the total frequency down-conversion amount;

calculating frequency variation amounts based on difference values between the frequency of the operating variable frequency modular units after the unload phase is performed and a current operating frequency;

calculating running rates of the operating variable frequency modular units after the unload phase is performed;

calculating an average running rate of the operating variable frequency modular units after the unload phase is performed based on the running rates of the operating variable frequency modular units after the unload phase is performed;

calculating an up-converted/down-converted frequency based on a difference value between the average running rate and the running rate of each of the operating variable frequency modular units after the unload phase is performed; and transmitting the frequency adjustment command to each of the operating variable frequency modular units.

12. The method of claim 3, wherein setting the different operations to the modular set comprises:

setting as the load phase when $T_w$-$T_w$-target is greater than D in a refrigeration working condition, or when $T_w$-target-$T_w$ is greater than D in a heating working condition, wherein D comprises a value based on an accuracy level of fluid temperature control;

setting as the holding phase when $T_w$-$T_w$.target is greater than or equal to −D and less than or equal to D in the refrigeration working condition, or when $T_w$.target-$T_w$ is greater than or equal to −D but less than or equal to D in the heating working condition; and setting as the unload phase when $T_w$-$T_w$.target is less than −D in the refrigeration working condition, or when $T_w$.target-$T_w$ is less than −D in the heating working condition; and wherein a load ratio of the modular set in a load area is set to a large load ratio, a load ratio or an unload ratio of the modular set in a fine-tuning area is set to a small load ratio or a small unload ratio, and an unload ratio of the modular set in an unload area is set to a large unload ratio.

13. The method of claim 2, wherein fine-tuning each of the operating variable frequency modular units based on the average load ratio of the plurality of variable frequency modular units comprises:

calculating a total frequency of operating variable frequency modular units of the plurality of variable frequency modular units;

calculating an average frequency of the operating variable frequency modular units based on the total frequency of the operating variable frequency modular units;

calculating a frequency variation amount based on a difference between the average frequency of the operating variable frequency modular units and a current operating frequency;

calculating running rates of the operating variable frequency modular units after the load phase or the unload phase is performed;

calculating an average running rate of the operating variable frequency modular units after the load phase or the unload phase is performed based on the running rates of the operating variable frequency modular units after the load phase or the unload phase is performed;

calculating an up-converted/down-converted frequency based on a difference between the average running rate and the running rate of each of the operating variable frequency modular units; and transmitting the frequency adjustment command to each of the operating variable frequency modular units.

14. The method of claim 1, comprising:

determining a minimum value, a, of the target load ratio range and a maximum value, b, of the target load ratio range;

wherein a=((n−1)/n)*t, such that a is greater than or equal to a start load ratio, s, and a is less than (t−x1), wherein n represents a total number of variable frequency modular units whose operation is not limited in the modular set, wherein t represents a load ratio when the modular set is at a threshold operation energy efficiency (COP Max), and wherein x1 is an offset value to avoid frequent start/stop of the modular set; and wherein b=t+(t/n), such that b is less than or equal to a load ratio, s', and greater than (t+x2), wherein the load ratio, s', is greater than the start load ratio, s, wherein s' and s comprise the predetermined energy efficiency value, and wherein x2 is an offset value to avoid frequent start/stop of the modular set.

15. The method of claim 1, wherein a variable frequency modular unit of the plurality of variable frequency modular units is set as a main variable frequency modular unit and comprises a main controller, wherein the main controller is configured to control operation of the plurality of variable frequency modular units, and wherein the modular set is in fluid communication with a plurality of indoor units and a plurality of floor heating units via a conduit.

16. An air conditioning system comprising a modular set that includes a plurality of variable frequency modular units, wherein the air conditioning system further comprises:

a main controller, wherein a variable frequency modular unit of the plurality of variable frequency modular units is set as a main variable frequency modular unit and all remaining variable frequency modular units of the plurality of variable frequency modular units are set as slave variable frequency modular units;

wherein the main controller is coupled to the main variable frequency modular unit and coupled to each slave variable frequency modular unit; and wherein the main controller is configured to apply a load phase, an unload phase, or a holding phase to each variable frequency modular unit of the plurality of variable frequency modular units based on an input energy adjustment amount.

17. The air conditioning system of claim 16, wherein the main controller is disposed on the main variable frequency modular unit.

18. The air conditioning system of claim 16, comprising a sensor configured to detect a current temperature of incoming and exiting fluid of the modular set, wherein the sensor is electrically coupled to the main controller.

19. The air conditioning system of claim 18, wherein the modular set is in fluid communication with a plurality of indoor units and a plurality of floor heating units.

20. The air conditioning system of claim 19, wherein the main controller is configured to apply the load phase or the unload phase;

wherein, during the load phase, an operating frequency of a corresponding variable frequency modular unit of the plurality of variable frequency modular units is configured to increase by a first respective frequency adjustment amount, wherein the first respective frequency adjustment amount is determined based on the input energy adjustment amount and an operating position of the corresponding variable frequency modular unit being within a target load ratio range, wherein an operating energy efficiency of each of the plurality of variable frequency modular units is greater than or equal to a predetermined energy efficiency value within the target load ratio range;

wherein, during the unload phase, the operating frequency of the corresponding variable frequency modular unit of the plurality of variable frequency modular units is configured to reduce by a second respective frequency adjustment amount, wherein the second respective frequency adjustment amount is determined based on the input energy adjustment amount and the operating position of the corresponding variable frequency modular unit being within the target load ratio range; and wherein the load phase or the unload phase causes the plurality of variable frequency modular units to operate within the target load ratio range after the load phase or the unload phase is performed.

* * * * *